UNITED STATES PATENT OFFICE.

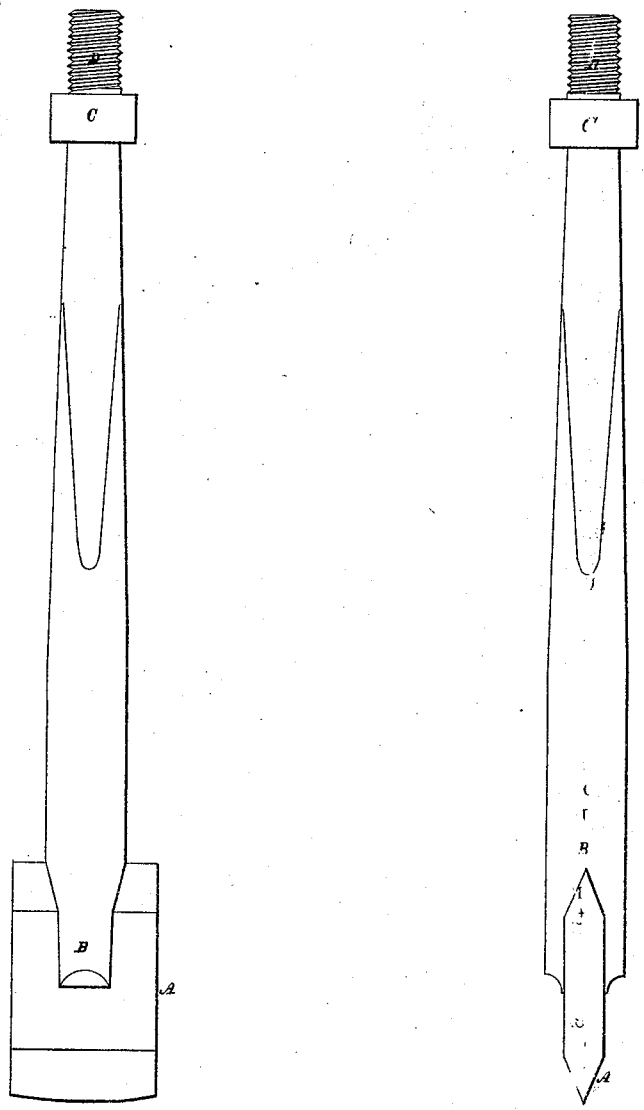

HENRY PALMER, OF SAN FRANCISCO, CALIFORNIA.

IMPROVED DRILL FOR ARTESIAN WELLS.

Specification forming part of Letters Patent No. 54,199, dated April 24, 1866.

*To all whom it may concern:*

Be it known that I, HENRY PALMER, of the city and county of San Francisco, State of California, have invented certain new and useful Improvements in Drills for Boring Oil or other Artesian Wells; and I do hereby declare that the following is a full, clear, and exact description of the construction and operation of the same, reference being had to the drawings making a part of this specification, in which letters of reference indicate like parts in each of the figures.

Figure 1 is a plan of my drill; Fig. 2, an edge view of the same.

The nature of my invention relates to the employment or use of a drill the top edge or shoulder of which forms a cutter, as well as the bit or lower edge, which acts as a reamer and prevents the drill, upon being raised, from getting clogged by any substance falling into the hole.

To enable others skilled in the art to make and use my drill for boring wells, I will proceed to describe its construction and operation.

In the drawings, A A represent the cutter, of highly-tempered steel, with beveled shoulders or upward cutters, inclining equally upon the adjacent planes to an edge, and inserted into the cleft stem B for about one-half of its length and firmly welded to it, the longitudinal axis of the cutter being a continuation of the stem. The upper edges are beveled, so that the drill will act as a reamer to the hole which is to be drilled and cut with an upward as well as a downward stroke, thereby preventing the wedging or clogging, as when round stones or other substances fall around the drill, in which case it will cut its way out.

The lower edge or cutter of my drill is beveled similar to that of the upper cutters or shoulders, and may be called "diamond shape."

In the construction of my drill care should be taken to temper the whole bit evenly, as well as to balance it nicely upon the stem, and have the union by welding between the stem and cutters carefully made.

The shoulder C and screw D are made in the same form as in common drills.

Having thus described my drill for boring wells, I will now proceed to state what I claim, and desire to secure by Letters Patent, to wit:

A double-edged drill cutting at the upward as well as at the downward stroke or blow, with beveled shoulders or upward cutters, inclining equally upon the adjacent planes and at right angles with the stem, substantially as and for the purposes specified and set forth.

In witness whereof I have hereunto affixed my hand and seal this 31st day of July, A. D. 1865.

HENRY PALMER. [L. S.]

Witnesses:
   C. W. STILES,
   A. HEESER.